(12) United States Patent
Niu

(10) Patent No.: US 10,887,847 B2
(45) Date of Patent: Jan. 5, 2021

(54) ACTIVE ANTENNA SYSTEM, MOBILE TERMINAL, AND CONFIGURATION METHOD OF ANTENNA SYSTEM

(71) Applicant: ZTE CORPORATION, Guangdong (CN)

(72) Inventor: Hui Niu, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 68 days.

(21) Appl. No.: 16/322,931

(22) PCT Filed: Nov. 14, 2016

(86) PCT No.: PCT/CN2016/105700
§ 371 (c)(1),
(2) Date: Feb. 2, 2019

(87) PCT Pub. No.: WO2018/006522
PCT Pub. Date: Jan. 11, 2018

(65) Prior Publication Data
US 2019/0182779 A1    Jun. 13, 2019

(30) Foreign Application Priority Data
Jul. 7, 2016   (CN) .......................... 2016 1 0533345

(51) Int. Cl.
*H04B 7/005*    (2006.01)
*H04W 52/30*    (2009.01)
(Continued)

(52) U.S. Cl.
CPC ............ *H04W 52/30* (2013.01); *H01Q 1/247* (2013.01); *H04B 1/44* (2013.01); *H04B 1/525* (2013.01);
(Continued)

(58) Field of Classification Search
CPC . H04W 52/30; H04W 52/52; H04W 52/0267; H04W 52/02; H04M 1/02;
(Continued)

(56) References Cited

U.S. PATENT DOCUMENTS 9,941,959 B2 *   4/2018  Heath ................ H04Q 11/0066
10,243,652 B2 *  3/2019  Heath ................... H04L 43/045
(Continued)

FOREIGN PATENT DOCUMENTS

CN    101459955 A    6/2009
CN    103384962 A    11/2013
(Continued)

OTHER PUBLICATIONS

International Search Report of PCT Patent Application No. PCT/CN2016/105700 dated Mar. 17, 2017.

*Primary Examiner* — Chuong T Ho

(57) ABSTRACT

Provided are an active antenna system, a mobile terminal, and a configuration method of an antenna system. The active antenna system includes an active amplification module and an external antenna. The active amplification module is detachably electrically coupled to an electronic device, wherein the active power amplification module includes an active antenna circuit for amplifying and filtering a signal transmitted and received by the external antenna, and the external antenna is detachably electrically coupled to the active power amplification module. The problem of increase of power consumption of the terminal caused by enlarging a signal radiation range of the terminal is solved, thereby realizing decrease of the power consumption of the terminal while enlarging the signal radiation range of the terminal.

17 Claims, 10 Drawing Sheets

(51) Int. Cl.

| | |
|---|---|
| *H04W 52/02* | (2009.01) |
| *H04B 1/525* | (2015.01) |
| *H04M 1/02* | (2006.01) |
| *H01Q 1/24* | (2006.01) |
| *H04B 1/44* | (2006.01) |
| *H04B 7/26* | (2006.01) |
| *H04L 5/14* | (2006.01) |
| *H04B 1/04* | (2006.01) |
| *H04W 52/52* | (2009.01) |

(52) U.S. Cl.
CPC ........... *H04B 7/2643* (2013.01); *H04L 5/143* (2013.01); *H04L 5/1461* (2013.01); *H04M 1/02* (2013.01); *H04W 52/02* (2013.01); *H04B 2001/0408* (2013.01); *H04W 52/52* (2013.01); *Y02D 30/70* (2020.08)

(58) Field of Classification Search
CPC ........ H04B 1/525; H04B 7/2643; H04B 1/44; H04B 2001/0408; H04L 5/1461; H04L 5/143; H01Q 1/247; Y02D 70/00
USPC .................................................. 370/278, 282
See application file for complete search history.

(56) References Cited

U.S. PATENT DOCUMENTS

| | | | |
|---|---|---|---|
| 10,404,368 B2* | 9/2019 | Heath | H04B 1/525 |
| 10,476,589 B2* | 11/2019 | Heath | H04B 1/10 |
| 10,693,556 B2* | 6/2020 | Heath | H04W 24/08 |
| 2015/0118975 A1* | 4/2015 | Sun | H04B 1/525 |
| | | | 455/77 |
| 2016/0248379 A1* | 8/2016 | Lehtola | H03F 3/72 |
| 2017/0010360 A1* | 1/2017 | Sokolov | H03F 3/193 |
| 2019/0123820 A1* | 4/2019 | Heath | H04W 24/08 |
| 2019/0158176 A1* | 5/2019 | Heath | H04B 1/10 |
| 2019/0182779 A1* | 6/2019 | Niu | H04B 1/44 |
| 2019/0326986 A1* | 10/2019 | Heath | H04L 43/045 |
| 2020/0244357 A1* | 7/2020 | Heath | H04B 1/525 |

FOREIGN PATENT DOCUMENTS

| | | |
|---|---|---|
| CN | 103986806 A | 8/2014 |
| CN | 205484811 U | 8/2016 |

\* cited by examiner

ACTIVE ANTENNA SYSTEM, MOBILE TERMINAL, AND CONFIGURATION METHOD OF ANTENNA SYSTEM

FIELD OF THE INVENTION

The present disclosure relates to the technical field of communication, and in particular, to an active antenna system, a mobile terminal, and a configuration method of an antenna system.

BACKGROUND OF THE INVENTION

With rapid development of communication technology, people's demands for data throughput of mobile terminals are increasingly promoted, and higher and higher requirements for miniaturization and portability of wireless communication products are also put forward in the meanwhile. It is hoped that the terminal will have a slimmer and more stylish appearance while maintaining its advanced performance (a broader signal radiation range, and higher system receiving sensitivity). In order to meet consumer demand for small wireless devices, the available space of a mobile terminal antenna is getting smaller and smaller, but it is difficult to design a compact antenna that works desirably in a wide frequency range. It is easier to realize antenna miniaturization for an active antenna as it ingrates a receiving antenna unit, a low noise amplifier unit, a power supply unit etc. Therefore, the development and application of active antennas has attracted more and more attention.

In addition, users not only need higher system receiving sensitivity, but also a broader signal radiation range. However, the smaller the terminal volume, the more difficult it is to dissipate heat when the transmitting power increases to enlarge the signal radiation range. Long time or high-intensity use would cause overheating of a processor, which may result in problems such as terminal disconnection.

With respect to the above problem, no efficient solution has been proposed yet.

SUMMARY OF THE INVENTION

Embodiments of the present disclosure provide an active antenna system, a mobile terminal, and a configuration method of an antenna system in order to at least solve the problem in the related art that, when an active antenna is in use, power consumption of a terminal is increased due to enlargement of a signal radiation range of the terminal.

According to one embodiment of the present disclosure, an active antenna system is provided, which comprises an active power amplifier and an external antenna. The active power amplifier detachably electrically coupled to an electronic device (e.g., a mobile terminal, and of course, it also may be other electronic devices that need antenna extension), wherein the active power amplifier comprises an active antenna circuit for amplifying and filtering a signal transmitted and received by the external antenna, and wherein the external antenna is detachably electrically coupled to the active power amplifier.

Alternatively, the active power amplifier further comprises: connectors configured to detachably electrically couple the active power amplifier to the electronic device; and bias tees, coupled between the connector and the active antenna circuit.

Alternatively, the active power amplifier further comprises a power management chip configured to manage an external power supply.

Alternatively, the external antenna comprises a first external antenna and a second external antenna, wherein the first external antenna is configured to receive and transmit a wireless signal, and the second external antenna is configured to receive a wireless signal.

Alternatively, the active antenna circuit comprises a signal transceiving path corresponding to the first external antenna and a signal receiving path corresponding to the second external antenna, and the number of the bias tees is two, i.e., a first bias tee and a second bias tee, wherein the first bias tee is coupled to the signal transceiving path, and the second bias tee is coupled to the signal receiving path.

Alternatively, the active antenna circuit is in a time division duplex mode, wherein the signal transceiving path comprises: a first switch, a first directional coupler (e.g., a 3 dB coupler), a first power amplifier, a second power amplifier, a second directional coupler, a first filter, a second switch, a first coupler, a second filter, and a first low noise amplifier, wherein a first end of the first switch is coupled to the first bias tee, and a second end of the first switch is coupled to the first directional coupler; the first power amplifier and the second power amplifier are coupled in parallel, and then coupled in series between the first directional coupler and the second directional coupler; the first filter is coupled in series between the second directional coupler and the second switch; the second switch is further coupled to the first coupler and the second filter, respectively; and the first low noise amplifier is coupled between the second filter and the first switch. The signal receiving path comprises: a third switch, a second low noise amplifier, a third filter, and an inverter, wherein a first end of the third switch is coupled to the second bias tee, and a second end of the third switch is coupled to the second low noise amplifier; the second low noise amplifier is further coupled to the third filter and the inverter, respectively; and the inverter is further coupled to the second bias tee; a third end of the third switch is coupled to the first coupler in the signal transceiving path, and a fourth end of the third switch is coupled to the first bias tee; the second low noise amplifier is further coupled to the first low noise amplifier in the signal transceiving path; and the inverter is further coupled to the first power amplifier and the second power amplifiers in the signal transceiving path, respectively.

Alternatively, the active antenna circuit is in a frequency division duplex mode, wherein the signal transceiving path comprises: a first duplexer, a first directional coupler, a first power amplifier, a second power amplifier, a second directional coupler, a second duplexer, a first coupler, and a first low noise amplifier, wherein a first end of the first duplexer is coupled to the first bias tee, and a second end of the first duplexer is coupled to the first directional coupler; the first power amplifier and the second power amplifier are coupled in parallel, and then coupled in series between the first directional coupler and the second directional coupler; the second duplexer is coupled in series between the second directional coupler and the first coupler; the first low noise amplifier is coupled between the first duplexer and the second duplexer; and the first power amplifier and the second power amplifier each are coupled to the first bias tee. The signal receiving path comprises: a third duplexer, a second low noise amplifier, and a third filter, wherein a first end of the third duplexer is coupled to the second bias tee, and a second end of the third duplexer is coupled to the second low noise amplifier; the second low noise amplifier is further coupled to the third filter and the second bias tee, respectively; a third end of the third duplexer is coupled to the first coupler in the signal transceiving path; and the second low noise amplifier is further coupled to the first low noise amplifier in the signal transceiving path.

According to another embodiment of the present disclosure, a mobile terminal is provided, which comprises a mobile terminal entity and the above-mentioned active antenna system, wherein the active antenna system is detachably coupled to the mobile terminal entity.

Alternatively, the mobile terminal entity comprises: a baseband unit, a radio frequency circuit, an antenna detecting unit, an antenna tuning unit, and an internal antenna, wherein the baseband unit is configured to synthesize a baseband signal to be transmitted, or decode a baseband signal received from the radio frequency circuit; the radio frequency circuit is configured to modulate a baseband signal for transmission, and demodulate and transmit a received wireless signal to the baseband unit; the antenna detecting unit is configured to detect a state of a detection point, and return corresponding state information to the baseband unit so that the baseband unit determines an type of an antenna (an internal passive antenna, an external passive antenna, or an external active antenna) coupled thereto; the antenna tuning unit is configured to perform antenna tuning based on a type of the antenna in use to achieve impedance matching between a transmitter and the antenna; and the internal passive antenna is coupled to the antenna tuning unit.

Alternatively, the antenna detecting unit includes a first antenna detecting unit and a second antenna detecting unit; the antenna tuning unit includes a first antenna tuning unit and a second antenna tuning unit; and the internal passive antenna includes a first internal antenna and a second internal antenna, wherein the first internal antenna is configured to receive and transmit a wireless signal, the second internal antenna is configured to receive a wireless signal, and the first internal antenna and the second internal antenna are coupled to the first antenna tuning unit and the second antenna tuning unit, respectively.

Alternatively, the mobile terminal entity further includes a third bias tee and a fourth bias tee, wherein a first end and a second end of the third bias tee are coupled to the first antenna detecting unit and the first antenna tuning unit, respectively, and a third end of the third bias tee is coupled to the first bias tee of the active antenna system via a connector; a first end and a second end of the fourth bias tee are coupled to the second antenna detecting unit and the second antenna tuning unit, respectively, and a third end of the fourth bias tee is coupled to the second bias tee of the active antenna system via a connector.

Alternatively, the radio frequency circuit is in a time division duplex mode, and the radio frequency circuit comprises: a radio frequency transceiver chip, a first signal transmitting circuit, a first signal receiving circuit, a second signal receiving circuit, and a closed-loop power control circuit. The first signal transmitting circuit comprises: a fourth switch, a third power amplifier, a fourth filter, a fifth switch, and a second coupler, wherein an input end of the fourth switch is coupled to an output end of the radio frequency transceiver chip; the fourth switch, the third power amplifier, the fourth filter, the fifth switch, and the second coupler are coupled one by one in series; an output end of the fourth switch is coupled to the fifth switch; and the second coupler is coupled to the first antenna tuning unit. The first signal receiving circuit comprises: a fifth filter and a third low noise amplifier, wherein an input end of the fifth filter is coupled to the fifth switch, and an output end of the fifth filter is coupled to an input end of the third low noise amplifier; and an output end of the third low noise amplifier is coupled to the radio frequency transceiver chip. The second signal receiving circuit comprises: a sixth switch, a sixth filter, and a fourth low noise amplifier which are coupled one by one in series, wherein an input end of the sixth switch is coupled to the second antenna tuning unit; and an output end of the fourth low noise amplifier is coupled to the radio frequency transceiver chip. The closed-loop power control circuit comprises: a seventh switch, an input end of the seventh switch is coupled to output ends of the second coupler and the sixth switch, respectively, and an output end of the seventh switch is coupled to the radio frequency transceiver chip.

Alternatively, the radio frequency circuit is in a frequency division duplex mode, and the radio frequency circuit comprises: a radio frequency transceiver chip, a second transmitting circuit, a third receiving circuit, a fourth receiving circuit, and a second closed-loop power control circuit. The second transmitting circuit comprises: a fourth switch, a third power amplifier, a fourth duplexer, and a second coupler, wherein an input end of the fourth switch is coupled to an output end of the radio frequency transceiver chip; the fourth switch, the third power amplifier, the fourth duplexer, and the second coupler are coupled one by one in series; and the second coupler is coupled to the first antenna tuning unit. The third receiving circuit comprises: a third low noise amplifier, wherein an input end of the third low noise amplifier is coupled to the fourth duplexer, and an output end of the third low noise amplifier is coupled to the radio frequency transceiver chip. The second closed-loop power control circuit comprises: a fifth duplexer and a fourth low noise amplifier, wherein an input end of the fifth duplexer is coupled to the second antenna tuning unit, and an output end of the fifth duplexer is coupled to an input end of the fourth low noise amplifier; and an output end of the fourth low noise amplifier is coupled to the radio frequency transceiver chip. The radio frequency transceiver chip further comprises a seventh switch which is coupled to the second coupler, the fifth duplexer, and the radio frequency transceiver chip, respectively.

According to further another embodiment of the present disclosure, a configuration method of an antenna system is provided, which is applied to the above-mentioned mobile terminal, the method comprising: detecting, by the antenna detecting unit, a level state of a detection point, and returning a level signal corresponding to a detected result to the baseband unit; determining, by the baseband unit, whether a current antenna is an internal passive antenna, an external passive antenna, or an external active antenna based on the detected result of the antenna detecting unit, and outputting corresponding control information to the antenna tuning unit; configuring, by the antenna tuning unit, corresponding antenna parameters according to the control information; and outputting, by the baseband unit, corresponding control information to a unit of the radio frequency circuit for configuring a working status of the radio frequency circuit.

Alternatively, the detection point is disposed at a connector between the mobile terminal entity and the active antenna system; when the detection point is at a high level, it is determined that an external active antenna is coupled to the connector; when the detection point is at a low level, it is determined that an external passive antenna is coupled to the connector; and when the detection point is in a high impedance state, it is determined that an internal passive antenna is coupled to the connector.

Alternatively, when the current antenna is an external active antenna, the baseband unit outputs corresponding control information to the active power amplifier and configures the active power amplifier into a corresponding working status.

Alternatively, configuring the active power amplifier into a corresponding working status comprises: disabling a transmitting power amplification circuit in the radio frequency circuit, and enabling a transmitting power amplification circuit in the active power amplifier.

According to further another embodiment of the present disclosure, a mobile terminal is further provided, which comprises: a baseband processing chip and a radio frequency circuit, wherein the radio frequency circuit comprises a radio frequency transceiver chip and a closed-loop power control circuit. The closed-loop power control circuit is configured to derive a power detection signal from a signal to be transmitted and send the power detection signal to the radio frequency transceiver chip. The radio frequency transceiver chip is configured to process and then input the power detection signal to the baseband processing chip. The baseband processing chip is configured to calculate an actual transmitting power of the terminal according to the power detection signal, and then adjust its own output power as required.

Alternatively, the radio frequency circuit further comprises a radio frequency front-end circuit which comprises a power amplifier and a filter, wherein an input end of the power amplifier is coupled to an output end of the radio frequency transceiver chip, and an output end of the power amplifier is coupled to an input end of the filter. The closed-loop power control circuit comprises a first coupler and a first switch, wherein an input end of the first coupler is coupled to an output end of the filter, a first output end of the first coupler is coupled to a first antenna coupled internally or externally, a second output end of the first coupler is coupled to the first switch, and the other end of the first switch is coupled to the radio frequency transceiver chip, and wherein the first antenna is a signal receiving and transmitting antenna.

Alternatively, the closed-loop power control circuit further comprises a second coupler and a second switch, wherein an input end of the second coupler is coupled to a second antenna coupled externally, an output end of the second coupler is coupled to the second switch, and the second switch is coupled to the first switch, and wherein the second antenna is a signal receiving antenna.

According to further another embodiment of the present disclosure, a storage medium is further provided, which is configured to store program code for performing steps of: detecting, by an antenna detecting unit, a level state of a detection point, and returning a level signal corresponding to a detected result to a baseband unit; determining, by the baseband unit, whether a current antenna is an internal passive antenna, an external passive antenna, or an external active antenna based on the detected result of the antenna detecting unit, and outputting corresponding control information to the antenna tuning unit; configuring, by antenna tuning unit, corresponding antenna parameters according to the control information; and outputting, by the baseband unit, corresponding control information to a unit of the radio frequency circuit for configuring a working status of the radio frequency circuit.

According to the present disclosure, through coupling the active antenna system to the active power amplifier in a detachably manner, the active power amplifier can be electrically coupled to an electronic device as an expandable independent module. In this way, while improving the transmit power and the receiving sensitivity of the terminal, it is also possible to make the power amplifier of the mobile terminal entity have no need to work when the active power amplifier is in use. Thus, the power consumption of the terminal itself is greatly reduced, and the battery life is further endurable. In addition, when used for a long time or in high intensity, the processor is also less likely to be down-converted due to overheating, which avoids terminal disconnection due to terminal overheating having an impact on the terminal performance, thereby ensuring normal operation of the terminal.

BRIEF DESCRIPTION OF THE DRAWINGS

The accompanying drawings herein provide better understanding of the present disclosure, and constitute one part of the Specification. The exemplary embodiments and description thereon of the present disclosure are used for explaining the present disclosure, but not for improperly limiting the present disclosure. In the drawings.

DETAILED DESCRIPTION OF THE EMBODIMENTS

The present disclosure will be explained in detail with reference to the accompanying drawings and the embodiments. It should be noted that, as long as there is no conflict, the embodiments of the present disclosure and the features in the embodiments can be combined with each other.

It should be noted that terms "first" and "second" in the description, the claims, and the accompanying drawings of the present disclosure are used to distinguish similar objects, and are not necessarily used to describe a specific order.

Embodiment 1

In this embodiment, an active antenna system is provided. As used hereinafter, the term "unit" can implement a combination of software and/or hardware of predetermined functions. Although the devices described in the following embodiments are preferably implemented through software, hardware or a combination of software and hardware is also possible and contemplated.

Figure 1:
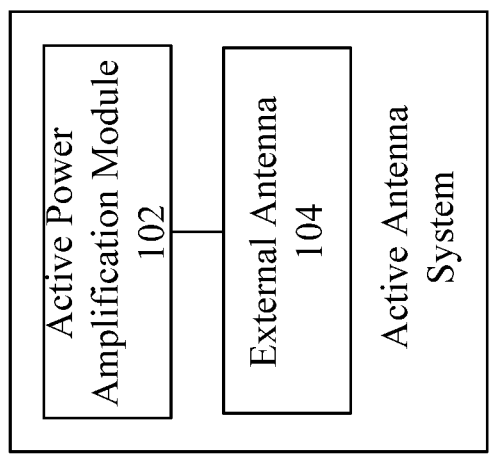
FIG. 1 is a block diagram showing a structure of an alternative active antenna system according to an embodiment of the present disclosure.

FIG. 1 is a block diagram showing a structure of an active antenna system according to this embodiment. As shown in FIG. 1, the system comprises an active power amplifier 102 and a passive antenna 104, 1) the active power amplifier 102 is detachably electrically coupled to an electronic device, wherein the active power amplifier comprises an active antenna circuit for amplifying and filtering a signal; and 2) the external antenna 104 is detachably electrically coupled to the active power amplifier.

Figure 2:
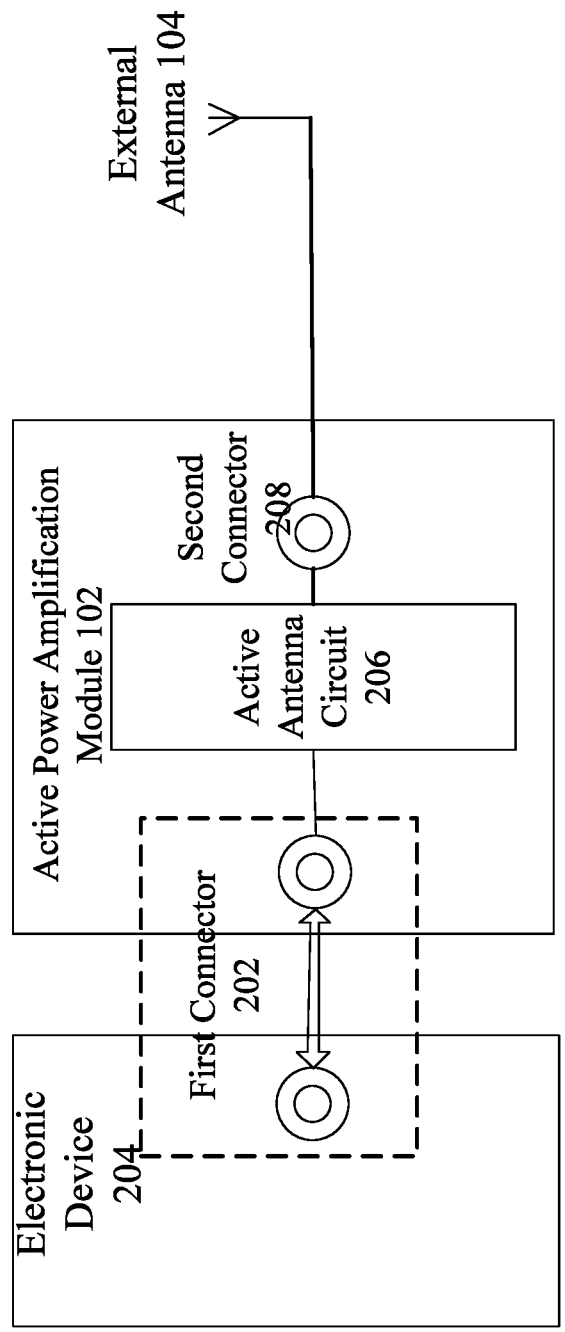
FIG. 2 is a block diagram showing a structure of another alternative active antenna system according to an embodiment of the present disclosure.

Alternatively, in this embodiment, the active antenna system may be applied, but not limited to, an application environment as shown in FIG. 2. As shown in FIG. 2, the active power amplifier 102 may be detachably electrically coupled to an electronic device 204 via a first connector 202. The active power amplifier 102 comprises an active antenna circuit 206 for amplifying and filtering a signal. An external antenna 104 is detachably electrically coupled to the active power amplifier 102 via a second connector 208. The electronic device may be, but not limited to, a communication device such as a mobile terminal. Said electronic device (e.g., a mobile terminal) may be, but not limited to, working independently, i.e., it can work independently without being coupled to an external active power amplifier or an external passive antenna. Alternatively, in this embodiment, the external antenna is configured to transmit and receive electromagnetic waves.

In other words, said active power amplifier may be, but not limited to being, an expandable module in the active antenna system. For example, users who often stay in areas with a relatively good wireless environment may not use the active power amplifier or the passive antenna. For another example, users who often stay in areas with a general wireless environment may use only the external passive antenna but not the active power amplifier. For further example, users who often stay in areas far away from a base station and with a poor wireless environment may use both the active power amplifier and the passive antenna. These above are only for examples, and not limited as such in this embodiment.

It should be noted that, in this embodiment, through detachably coupling the active power amplifier to the active antenna system, the active power amplifier can be used as an expandable independent module to electrically couple to the electronic device. In this way, while improving the transmitting power and the receiving sensitivity of the terminal, it is also possible to make a power amplifier of the mobile terminal entity have no need to work while the active power amplifier is operating. Thus, the power consumption of the terminal itself is greatly reduced, and the battery life is further endurable. In addition, when used for a long time or in high intensity, a processor of the terminal is also less likely to be down-converted due to overheating, which avoids terminal disconnection due to terminal overheating having an impact on the terminal performance, thereby ensuring normal operation of the terminal.

Alternatively, in this embodiment, the active power amplifier further comprises connectors configured to detachably electrically couple the active power amplifier to the electronic device, and bias tees coupled between the connector and the active antenna circuit.

It should be noted that, in this embodiment, the role of said bias tee may be, but is not limited to, enabling a radio frequency signal to be transmitted by the terminal and a DC signal (including a control signal and a detecting voltage) in the terminal to be outputted from one shared connector port, or dividing a signal inputted via a transmission path into a radio frequency signal and a DC signal. The above is only for an example, and not limited as such in this embodiment.

Alternatively, in this embodiment, the number of the bias tee may be, but not limited to, two, i.e., a first bias tee and a second bias tee. The first bias tee is coupled to a signal transceiving path, and the second bias tee is coupled to a signal receiving path.

Alternatively, in this embodiment, the active power amplifier further comprises a power management chip configured to manage an external power supply.

It should be noted that, in this embodiment, said active power amplifier may be powered by a USB interface or a power adapter via said power management chip, which, however, is not limited thereto. The above is only for an example, and not limited as such in this embodiment.

As an alternative embodiment, the number of said passive antenna may be, but not limited to, two, i.e., a first antenna and a second antenna. The first antenna is configured to receive and transmit a wireless signal, and the second antenna is configured to receive a wireless signal.

It should be noted that, in this embodiment, the number of the connector for coupling with the passive antenna may be matched with the number of the passive antenna, which, however, is not limited thereto.

Figure 3:
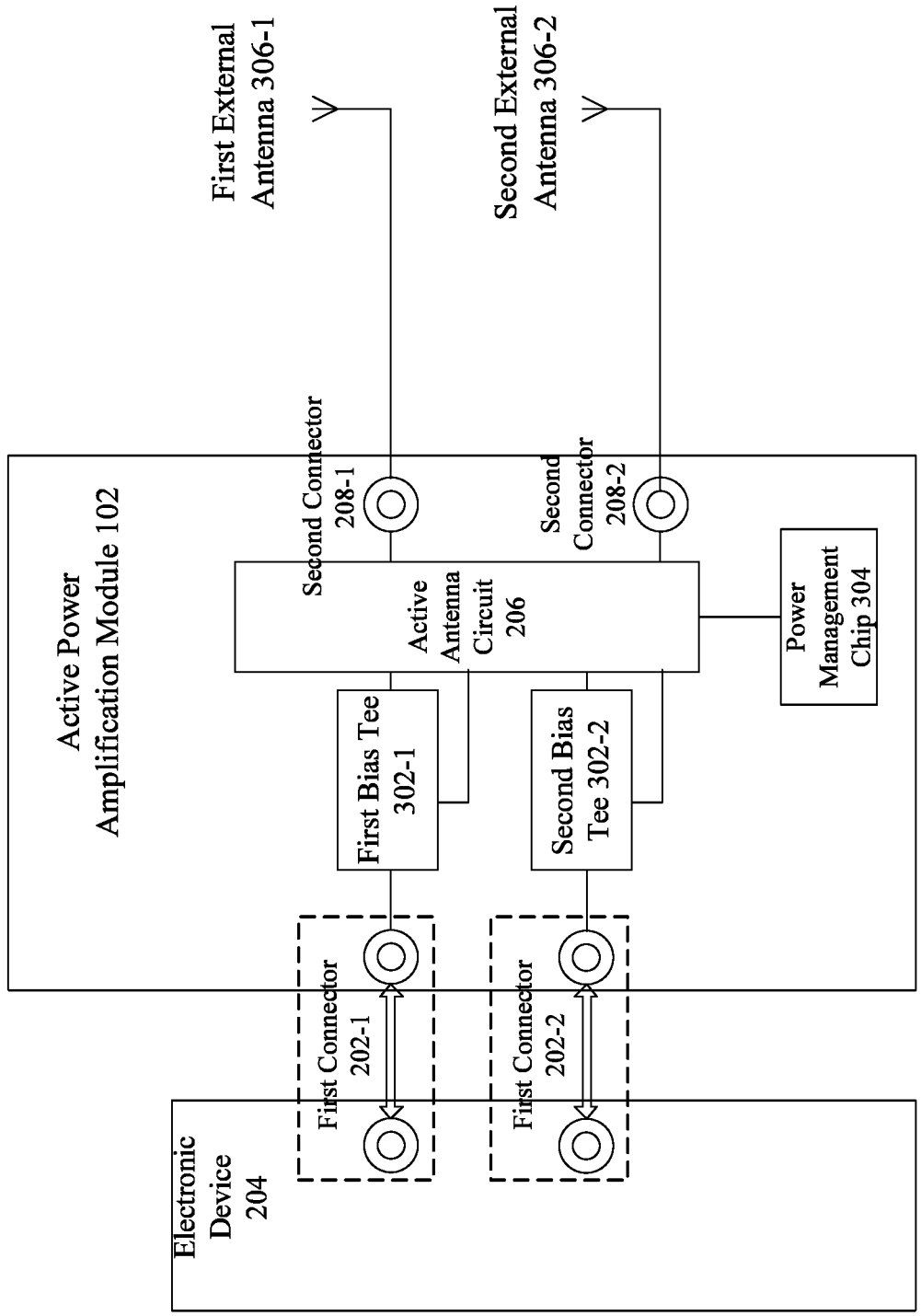
FIG. 3 is a block diagram showing a structure of a further alternative active antenna system according to an embodiment of the present disclosure.

For example, as shown in FIG. 3, it is assumed that an active power amplifier 102 includes two bias tees, which are a first bias tee 302-1 and a second bias tee 302-2, respectively. The first bias tee 302-1 is coupled between a first connector 202-1 and an active antenna circuit 206, and the second bias tee 302-2 is coupled between a first connector 202-2 and the active antenna circuit 206. In addition, it is assumed that the number of the passive antenna is two, i.e., a first antenna 306-1 and a second antenna 306-2. The active antenna circuit 206 may be coupled to the first antenna 306-1 via, but not limited to, a second connector 208-1, and the active antenna circuit 206 may be coupled to the second antenna 306-2 via (but not limited to) a second connector 208-2. In addition, a power management chip 304 for managing an external power supply is coupled to the active antenna circuit 206. It should be noted that the above is only for an example, such as, a plurality of passive antennas each may be coupled to the active antenna circuit via, but not limited to, the second connector (not shown), which is not limited as such in this embodiment.

Alternatively, in this embodiment, the electronic device may be, but not limited to, an entity of a mobile terminal. The entity of the mobile terminal entity may comprise, but is not limited to, a baseband unit, a radio frequency circuit, an antenna detecting unit, an antenna tuning unit, and an internal antenna.

The above units each have functions as follows.

1) The baseband unit comprises a baseband processing chip, a power management chip, and a memory etc., and is configured to synthesize a baseband signal to be transmitted, or decode a baseband signal received from the radio frequency unit. At the same time, the baseband unit is further responsible for power supply, control and management of the entire terminal.

2) The radio frequency circuit is configured to modulate and transmit a digital baseband signal to a base station, and demodulate and transmit a wireless signal received from a base station to the baseband chip for processing.

3) The antenna detecting unit is configured to detect a state of a detection point (such as a connector), and return corresponding state information to the baseband processing chip, wherein the baseband processing chip determines whether an antenna connected to the antenna detecting unit is a passive internal antenna, a passive external antenna, or an active antenna.

4) The antenna tuning unit is configured to perform antenna tuning based on the type of the used antenna to achieve impedance matching between a transmitter and the antenna.

5) The internal antenna is an energy conversion device in a mobile communication system, and is configured to transmit or receive electromagnetic waves.

Embodiments of the present disclosure may be applied to, but not limited to, a multi-antenna system. By taking an active antenna system with two antennas as an example below, specific description is set forth below with reference to an active antenna system shown in FIG. 4.

Figure 4:
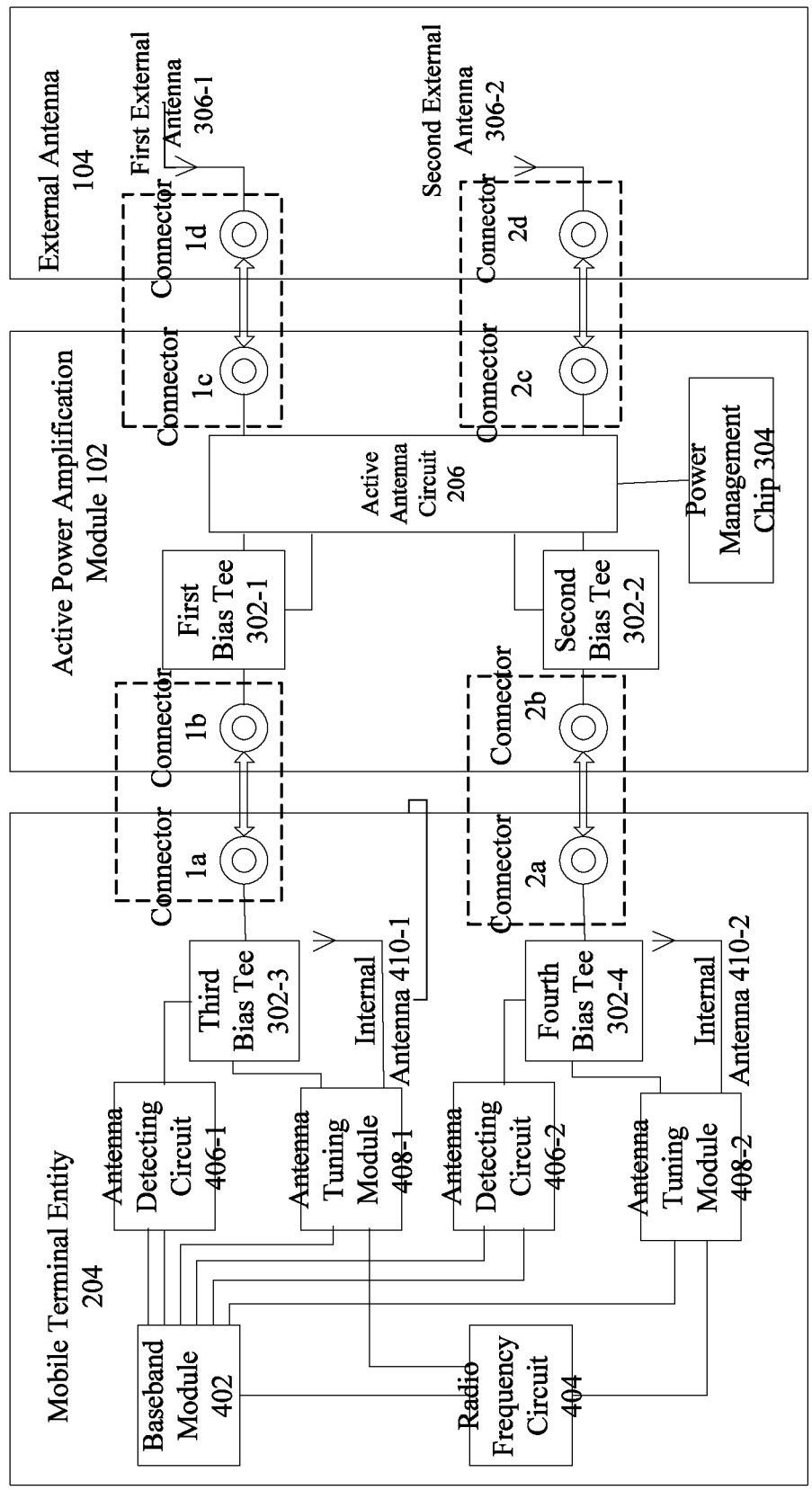
FIG. 4 is a block diagram showing a structure of further another alternative active antenna system according to an embodiment of the present disclosure.

In the active antenna system shown in FIG. 4, the active power amplifier 102 may be detachably electrically coupled to the mobile terminal 204 via the first connector 202-1 (i.e., connectors 1a and 1b) and the first connector 202-2 (i.e., connectors 2a and 2b). The active power amplifier 102 includes the active antenna circuit 206 for amplifying and filtering a signal. The external passive antenna 104 is detachably electrically coupled to the active power amplifier 102 via the second connector 208-1 (i.e., connectors 1c and 1d) and the second connector 208-2 (i.e., connectors 2c and 2d). It is assumed that the active power amplifier also includes two bias tees, which are the first bias tee 302-1 and the second bias tee 302-2, respectively. The first bias tee 302-1 is coupled to a signal transceiving path, and the second bias tee 302-2 is coupled to a signal receiving path. In this embodiment, as shown in FIG. 4, a mobile terminal entity 204 correspondingly includes a third bias tee 302-3 and a fourth bias tee 302-4, and further comprises a baseband unit 402, a radio frequency circuit 404, antenna detecting units (an antenna detecting unit 406-1 and an antenna detecting unit 406-2), antenna tuning units (an antenna tuning unit 408-1 and an antenna tuning module 408-2), and internal antennas (an internal antenna 410-1 and an internal antenna 410-2). The active antenna circuit includes a signal transceiving path corresponding to the first antenna and a signal receiving path corresponding to the second antenna, i.e., the internal antenna 1 or the external antenna 1 is used for both transmitting and receiving, and the internal antenna 2 or the external antenna 2 is only used for receiving.

Procedures of using the active antenna system are as follows.

After starting up, under the control of a baseband processing chip in the baseband unit 402, the antenna detecting circuit 406-1 and the antenna detecting circuit 406-2 first detect voltage level states of the detection points (i.e., the connectors 1a and 1b), respectively, and output and return level signals corresponding to the detected results to the baseband processing chip. The antenna detecting circuit includes a three-state NOT gate, an output end of which is coupled to the detection point via the bias tee (the third bias tee 302-3, the fourth bias tee 302-4). The baseband processing chip determines whether the antennas coupled at the connector 1a and the connector 1b are external active antennas, external passive antennas, or internal active antennas based on state of the detection points being of a high level, a low level, or a high resistance, and outputs corresponding control information to the antenna tuning unit 1 and the antenna tuning unit 2. The antenna tuning module 1 and the antenna tuning module 2 are configured with corresponding antenna parameters accordingly to achieve a good match between the terminal and the corresponding antennas.

The role of said bias tee is to enable a radio frequency signal and a DC signal (including a control signal and a detecting voltage) to be outputted from a shared connector port, or divide a signal inputted via a transmitting circuit into a radio frequency signal and a DC signal.

At the same time, the baseband processing chip outputs corresponding control information to the radio frequency circuit and configures a working status of the radio frequency circuit. When an internal antenna or an external passive antenna is in use, the terminal enters a normal working status. When an external active antenna is in use, the baseband processing chip outputs the corresponding control signal to the active power amplifier and configures it into a corresponding working status, and then the terminal starts to the normal working status.

According to the embodiments provided in the present application, through detachably coupling the active power amplifier to the active antenna system, the active power amplifier can be used as an expandable independent module to electrically couple to the electronic device. In this way, while improving the transmitting power and the receiving sensitivity of the terminal, it is also possible to make a power amplifier of the mobile terminal entity have no need to work while the active power amplifier is operating. Thus, the power consumption of the terminal itself is greatly reduced, and the battery life is further endurable. In addition, when used for a long time or in high intensity, a processor of the terminal is also less likely to be down-converted due to overheating, which avoids terminal disconnection due to terminal overheating having an impact on the terminal performance, thereby ensuring normal operation of the terminal.

As an alternative solution, the active antenna circuit is in a time division duplex mode, wherein:

1) the signal transceiving path comprises a first switch, a first directional coupler, a first power amplifier, a second power amplifier, a second directional coupler, a first filter, a second switch, a first coupler, a second filter, and a first low noise amplifier, wherein a first end of the first switch is coupled to the first bias tee, and a second end of the first switch is coupled to the first directional coupler; the first power amplifier and the second power amplifier are coupled in parallel and then coupled in series between the first directional coupler and the second directional coupler; the first filter is coupled in series between the second directional coupler and the second switch; the second switch is further coupled to the first coupler and the second filter, respectively; and the first low noise amplifier is coupled between the second filter and the first switch; and 2) the signal receiving path comprises a third switch, a second low noise amplifier, a third filter, and an inverter, wherein a first end of the third switch is coupled to the second bias tee, and a second end of the third switch is coupled to the second low noise amplifier; the second low noise amplifier is further coupled to the third filter and the inverter, respectively, and the inverter is further coupled to the second bias tee; a third end of the third switch is coupled to the first coupler in the signal transceiving path, and a fourth end of the third switch is coupled to the first bias tee; the second low noise amplifier is further coupled to the first low noise amplifier in the signal transceiving path; and the inverter is further coupled to the first power amplifier and the second power amplifier in the signal transceiving path, respectively.

Alternatively, in this embodiment, said directional couplers may be, but not limited to, 3 dB couplers.

Figure 5:
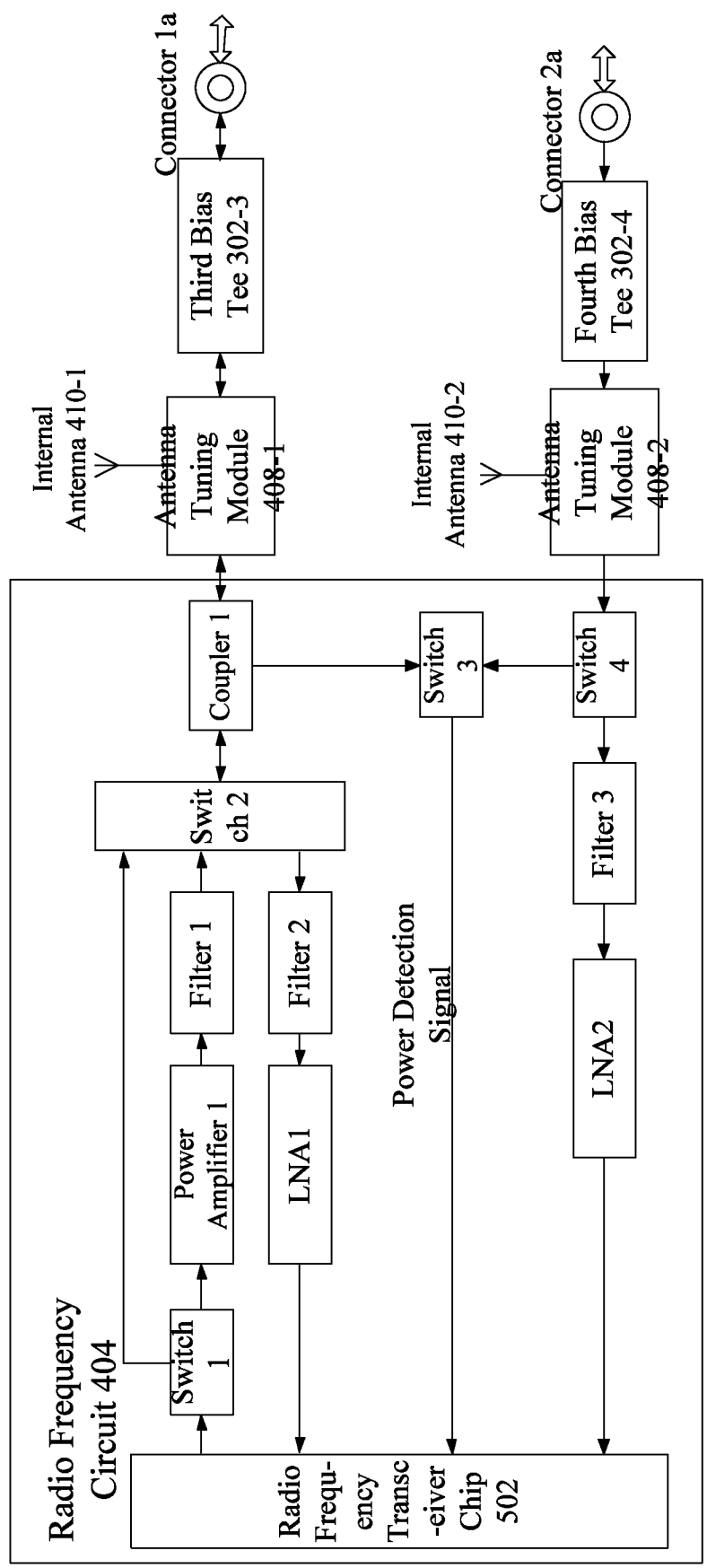
FIG. 5 is a circuit connection diagram of an alternative radio frequency circuit in a time division duplex working mode according to an embodiment of the present disclosure.
Figure 6:
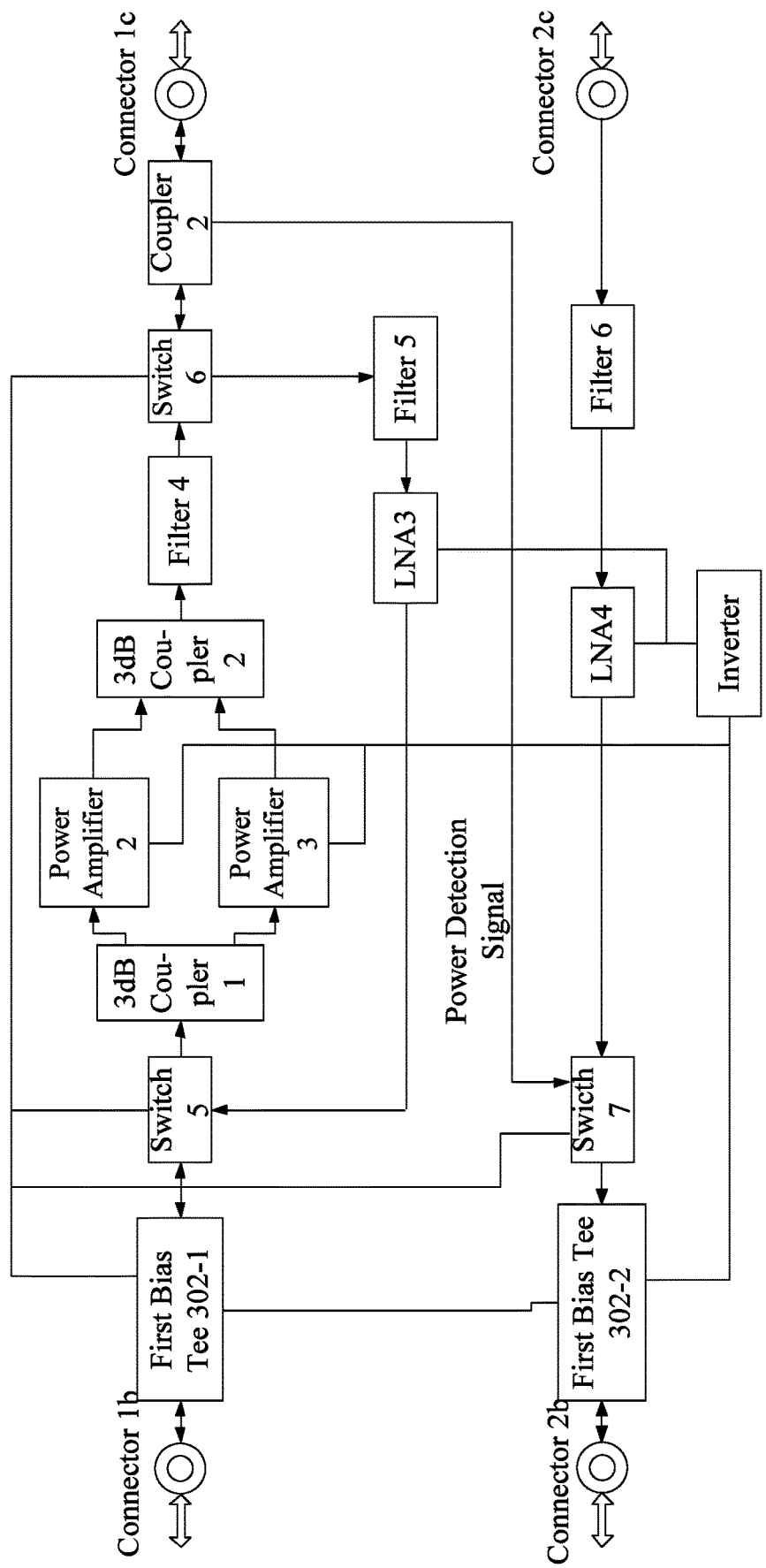
FIG. 6 is a circuit connection diagram of an alternative active antenna circuit in a time division duplex working mode according to an embodiment of the present disclosure.

Specific details will be illustrated with reference to FIGS. 5 and 6. FIG. 5 is a circuit connection diagram when the radio frequency circuit works in a time division duplex mode. FIG. 6 is a circuit connection diagram when the active antenna circuit works in a time division duplex mode.

In this embodiment, working steps of the time division duplex working mode are as follows.

In step S1, the baseband processing chip determines a type of an antenna in use based on information returned by the antenna detecting circuit, and then outputs a corresponding control signal to the radio frequency circuit.

In step S2, working steps of the radio frequency circuit and the active power amplifier are as follows.

As an alternative embodiment, the working steps are as follows when a passive antenna (internal or external) is in use.

In step S2-1, a transmission signal outputted by a radio frequency transceiver chip 502 enters a power amplifier 1, a filter 1, a switch 2, and a coupler 1 via a switch 1, and then enters the antenna tuning unit 408-1; after that, the internal antenna 410-1 or the first antenna 306-1 performs energy conversion and then transmits the transmission signal as an electromagnetic wave.

In step S2-2, signals are received by using the internal antenna 410-1 and the internal antenna 410-2, or the first antenna 306-1 and the second antenna 306-2. A signal received by the internal antenna 410-1 or the first antenna 306-1 returns to the radio frequency transceiver chip 502 via the antenna tuning unit 408-1, the coupler 1, the switch 2, a filter 2, and an LNA1; and a signal received by the internal antenna 410-2 or the second antenna 306-2 is returned to the radio frequency transceiver chip 502 via the antenna tuning unit 408-2, a switch 4, a filter 3, and an LNA2.

Here, it should be noted that the amplification of the transmitting power is implemented inside the mobile terminal entity. Meanwhile, closed-loop power control is enabled by returning a power detection signal to the radio frequency transceiver chip 502 via the coupler 1 and a switch 3. That is, the baseband processing chip transmits a signal to be transmitted to the radio frequency transceiver chip 502, and the signal is modulated by the radio frequency transceiver chip 502, then enters a radio frequency front-end circuit, i.e., the power amplifier 1 and the filter 1, for amplification and filtering, and then enters the coupler 1 via a switch; the signal outputted from a coupling end of the coupler 1 as a power detection signal is returned to the radio frequency transceiver chip 502 via the switch 3, and after processed by the radio frequency transceiver chip 502, it enters the baseband processing chip; and the baseband processing chip calculates an actual transmitting power of the terminal based on the power detection signal, and then adjusts its own output power as desired to perform the entire closed-loop power control.

As another alternative embodiment, when an active antenna is in use, the connectors 1a and 1b are mounted together with each other, and so the connectors 1c and 1d, the connectors 2a and 2b, and the connectors 2c and 2d do.

In step S2-1', the transmission signal outputted by the radio frequency transceiver chip 502 directly enters the switch 2 via the switch 1, reaches the connector 1a via the coupler 1, the antenna tuning unit 408-1, and the third bias tee 302-3, and then enters the active power amplifier 102 via the connector 1b; the signal enters the 3 dB coupler 1 via the first bias tee 302-1 and a switch 5 in the active power amplifier; then, the signal is divided into two signals of the same level, these two signals entering the power amplifier 2 and the power amplifier 3, respectively, so as to be amplified, and then being synthesized via a 3 dB coupler 2; after that, the synthesized signal enters a filter 4 to perform the filtering, and then enters the first antenna 306-1 via a switch 6, the coupler 2, and the connectors 1c and 1d; and, the first antenna performs energy conversion and sends out an electromagnetic wave.

In step S2-2', signals are received by using two antennas, i.e., the first antenna 306-1 and the second antenna 306-2. A signal received by the first antenna 306-1 enters a coupler 2, the switch 6, a filter 5, an LNA 3, the switch 5, and the first bias tee 302-1 via the connectors 1d and 1c, and reaches the connector 1b; then, in the mobile terminal entity 204, the signal enters the mobile terminal entity 204 via the connector 1a, and is returned to the radio frequency transceiver chip 502 via the third bias tee 302-3, the antenna tuning unit 408-1, the coupler 1, the switch 2, the filter 2, and the LNA1; a signal received by the second antenna 306-2 enters a filter 6, an LNA4, a switch 7, and the second bias tee 302-2 via connectors 2d and 2c, and reaches the connector 2b; afterwards, the signal enters the mobile terminal entity 204 via the connector 2a, and is returned to the radio frequency transceiver chip 502 via the fourth bias tee 302-4, the antenna tuning unit 408-2, the switch 4, the filter 3, and the LNA2 in the mobile terminal entity 204.

Here, it should be noted that the amplification of the transmit power is implemented in the active power amplifier. In an active modular antenna, an uplink signal is amplified using an integrated power amplifier that is commonly used at the terminal and by means of balanced power amplification. In this embodiment, two 3 dB couplers are used, so that the output power reaches two times as much as the output power when only one power amplifier is used in the terminal entity for amplification.

In addition, downlink signals received by the antenna 1 and the antenna 2 are respectively amplified by using the LNAs on the respective receiving paths to improve the receiving sensitivity.

In this embodiment, control signals of the power amplifiers and of the LNAs are outputted from the baseband processing chip of the mobile terminal entity, and then induced into the active power amplifier via a radio frequency connector port. Since two radio frequency ports can only introduce two control signals, one of the control signals (introduced by the first bias tee) are used to control several transceiving switches. The other control signal (introduced by the second bias tee) is used to control the enabling of the power amplifier 2 and the power amplifier 3, and an inverted signal of such control signal is used to control the enabling of the LNA3 and the LNA4.

Further, closed-loop power control is achieved by introducing a power detection signal from the connector port of the receiving antenna 2 into the mobile terminal entity. That is, the power detection signal outputted by the coupler 2 reaches the connector 2b via the switch 7 and the second bias tee 302-2, enters the mobile terminal entity via the connector 2a, and in the mobile terminal entity, the signal is returned to the radio frequency transceiver chip 502 via the fourth bias tee 302-2, the antenna tuning unit 408-2, the switch 4, and the switch 3. That is, when the power amplification is implemented in the active power amplifier, the closed-loop power control of an entire link is achieved by using the terminal entity and using a connector of another receiving antenna (i.e., the independent receiving antenna other than the transmitting antenna) on the active power amplifier as an entrance of the power detection signal.

According to the embodiments provided in the present application, as a result of enabling closed-loop power control in the time division duplex operation mode, the current user service quality is improved while the transmitting power of the terminal is increased. In this way, under a premise that the service quality required by users is ensured through the effective power control, the transmitting power and the system interference can be minimized.

As an alternative solution, the active antenna circuit is in the frequency division duplex working mode, wherein:

1) the signal transceiving path comprises a first duplexer, a first directional coupler, a first power amplifier, a second power amplifier, a second directional coupler, a second duplexer, a first coupler, and a first low noise amplifier, wherein a first end of the first duplexer is coupled to the first bias tee, a second end of the first duplexer is coupled to the first directional coupler; the first power amplifier and the second power amplifier are coupled in parallel and then coupled in series between the first directional coupler and the second directional coupler; the second duplexer is coupled in series between the second directional coupler and the first coupler; the first low noise amplifier is coupled between the first duplexer and the second duplexer; and the first power amplifier and the second power amplifier each are coupled to the first bias tee; and 2) the signal receiving path comprises a third duplexer, a second low noise amplifier, and a third filter, wherein a first end of the third duplexer is coupled to the second bias tee, and a second end of the third duplexer is coupled to the second low noise amplifier; the second low noise amplifier is further coupled to the third filter and the second bias tee, respectively; a third end of the third duplexer is coupled to the first coupler in the signal transceiving path; and the second low noise amplifier is further coupled to the first low noise amplifier in the signal transceiving path.

Alternatively, in this embodiment, said directional couplers may be, but not limited to, 3 dB couplers.

Figure 7:
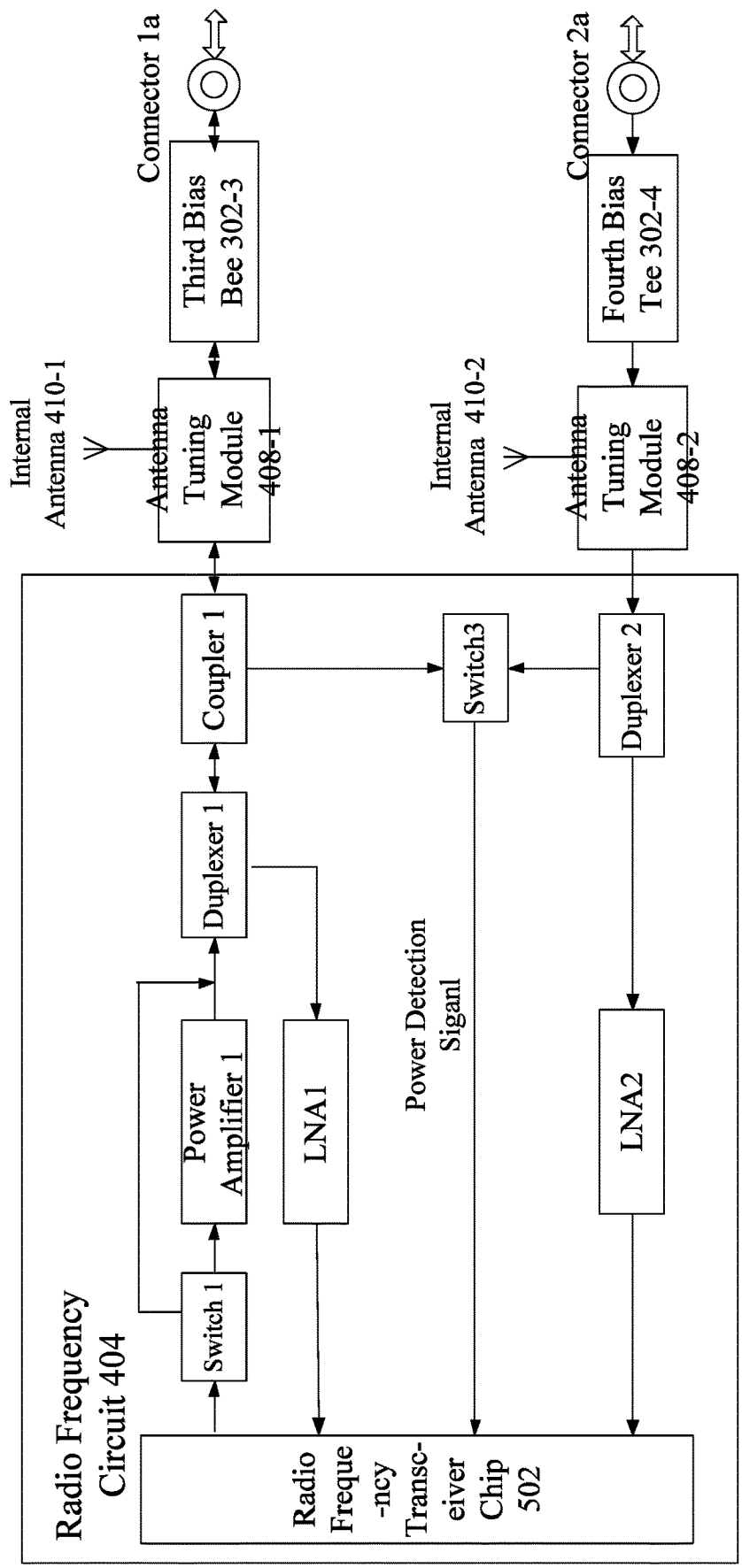
FIG. 7 is a circuit connection diagram of an alternative radio frequency circuit in a frequency division duplex working mode according to an embodiment of the present disclosure.
Figure 8:
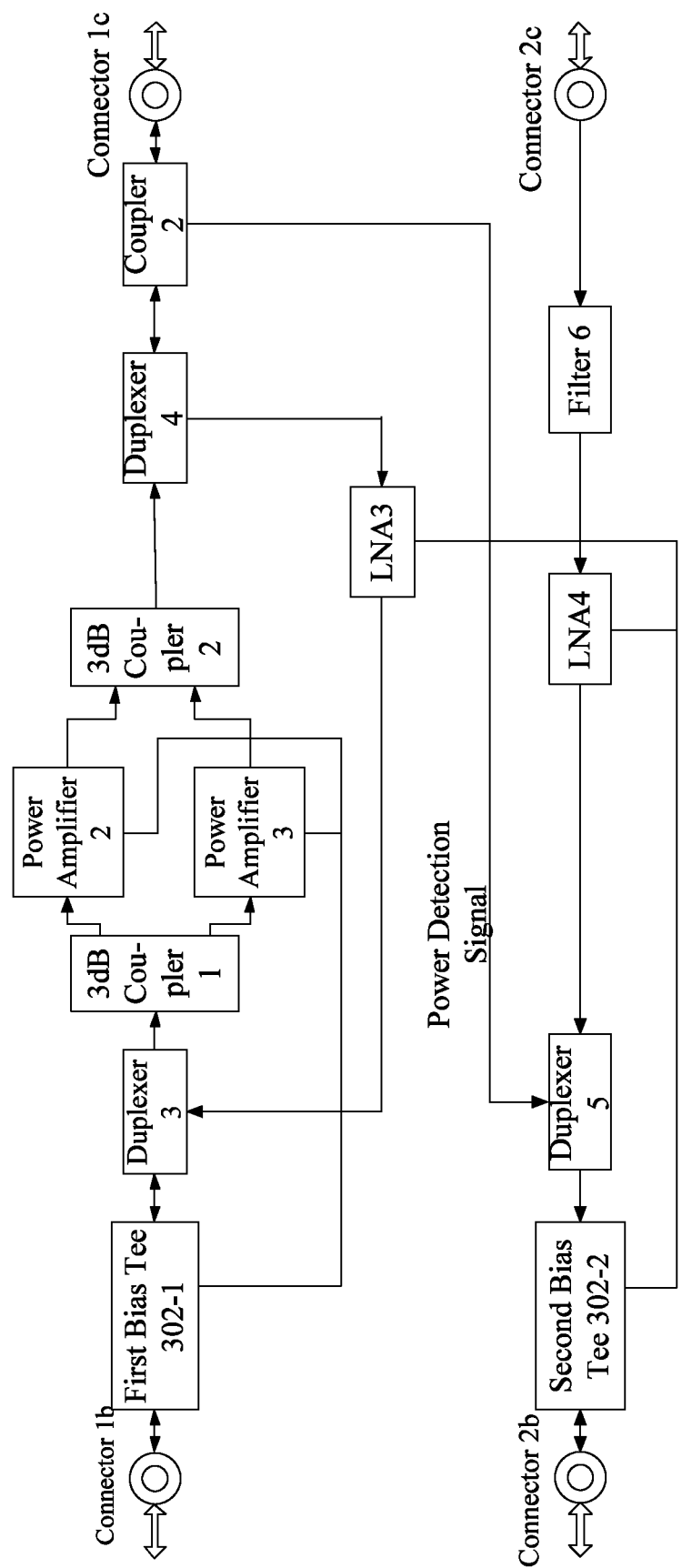
FIG. 8 is a circuit connection diagram of an alternative active antenna circuit in a frequency division duplex working mode according to an embodiment of the present disclosure.

Specific details will be illustrated with reference to FIGS. 7 and 8. FIG. 7 is a circuit connection diagram when the radio frequency circuit works in the frequency division duplex mode. FIG. 8 is a circuit connection diagram when the active antenna circuit works in the frequency division duplex mode.

In this embodiment, working steps of the frequency division duplex mode are as follows.

In step S1, the baseband processing chip determines a type of an antenna in use based on information returned by the antenna detecting circuit, and then outputs a corresponding control signal to the radio frequency circuit.

In step S2, working steps of the radio frequency circuit and the active power amplifier are as follows.

As an alternative embodiment, when a passive antenna (internal or external) is in use, the working steps are as follows.

In step S2-1, a transmission signal outputted by the radio frequency transceiver chip 502 enters a power amplifier 1, a duplexer 1, and a coupler 1 via a switch 1, and then enters the antenna tuning unit 408-1; after that, the internal antenna 410-1 or the first antenna 306-1 performs energy conversion and then transmits the transmission signal as an electromagnetic wave.

In step S2-2, signals are received by using the internal antenna 410-1 and the internal antenna 410-2, or the first antenna 306-1 and the second antenna 306-2. A signal received by the internal antenna 410-1 or the first antenna 306-1 returns to the radio frequency transceiver chip 502 via the antenna tuning unit 408-1, the coupler 1, the duplexer 1, and the LNA1; and a signal received by the internal antenna 410-2 or the second antenna 306-2 is returned to the radio frequency transceiver chip 502 via the antenna tuning unit 408-2, a duplexer 2, and an LNA2.

Here, it should be noted that the amplification of transmitting power is implemented inside the mobile terminal entity. Meanwhile, closed-loop power control is enabled by returning a power detection signal to the radio frequency transceiver chip 502 via the coupler 1 and the switch 3. In addition, for the processing of the closed-loop power control, reference can be made to the above-mentioned time division duplex mode, and the details are omitted herein.

As another alternative embodiment, when an active antenna is in use, the connectors 1a and 1b are mounted together with each other, and so the connectors 1c and 1d, the connectors 2a and 2b, and the connectors 2c and 2d do.

In step S2-1', a transmission signal outputted from the radio frequency transceiver chip 502 directly enters the duplexer 1 via the switch 1, and reaches the connector 1a via the coupler 1, the antenna tuning unit 408-1, and the third bias tee 302-3, and then enters the active power amplifier 102 via the connector 1b; subsequently, the signal enters the 3 dB coupler 1 via the first bias tee 302-1 and a duplexer 3 in the active power amplifier 102; then, the signal is divided into two signals of the same level, these two signals entering the power amplifier 2 and the power amplifier 3, respectively, and then being synthesized via the 3 dB coupler 2; after that, the synthesized signal enters a duplexer 4 to perform the filtering, and then enters the first antenna 306-1 via the coupler 2 and the connectors 1c and 1d; and the antenna performs energy conversion and sends out an electromagnetic wave.

In step S2-2', signals are received by using two antennas, i.e., the first antenna 306-1 and the second antenna 306-2. A signal received by the first antenna 306-1 enters the coupler 2, the duplexer 4, the LNA 3, the duplexer 3, the first bias tee 302-1 via the connectors 1d and 1c, and reaches the connector 1b; then, in the mobile terminal entity, the signal enters the mobile terminal entity via the connector 1a, and is returned to the radio frequency transceiver chip 502 via the third bias tee 302-3, the antenna tuning unit 408-1, the coupler 1, the duplexer 1, and the LNA1; a signal received by the second antenna 306-2 enters the filter 6 via the connectors 2d and 2c, and reaches the connector 2b via the LNA4, a duplexer 5, and the second antenna 306-2; afterwards, the signal enters the mobile terminal entity via the connector 2a, and is returned to the radio frequency transceiver chip 502 via the fourth bias tee 302-4, the antenna tuning unit 408-2, the duplexer 2, and the LNA2 in the mobile terminal entity.

Here, it should be noted that the amplification of the transmit power is implemented in the active power amplifier. In an active modular antenna, the uplink signals are amplified using an integrated power amplifier that is commonly used at the terminal and by means of balanced power amplification. In this embodiment, two 3 dB couplers are used, so that the output power reaches two times as much as the output power when only one power amplifier is used in the terminal entity for amplification.

In addition, the downlink signals received by the antenna 1 and the antenna 2 are respectively amplified by using the LNAs on the respective receiving paths to improve the receiving sensitivity.

In this embodiment, control signals of the power amplifiers and of the LNAs are transmitted from the baseband processing chip of the mobile terminal entity, and then induced into the active power amplifier via a radio frequency connector port. Two radio frequency ports can only introduce two control signals, wherein one of the control signals (introduced by the first bias tee) is used to control the enabling of the power amplifier 2 and the power amplifier 3, and the other control signal (introduced by the second bias tee) is used to control the enabling of the LNA3 and the LNA4.

Further, closed-loop power control is achieved by introducing a power detection signal from the connector port of the receiving antenna 2 into the mobile terminal entity. That is, the power detection signal outputted by the coupler 2 reaches the connector 2*b* via the duplexer 5 and the second bias tee 302-2, enters the mobile terminal entity via the connector 2*a*, and in the terminal entity, the signal is returned to radio frequency transceiver chip 502 via the fourth bias tee 302-2, the antenna tuning unit 408-2, the duplexer 2, and the switch 3.

According the embodiments provided in the present application, as a result of enabling closed-loop power control in the frequency division duplex operation mode, the current user service quality is improved while the transmitting power of the terminal is increased. In this way, under a premise that the service quality required by users is ensured by means of the effective power control, the transmitting power and the system interference can be minimized.

Through the description of the above embodiments, those skilled in the art can clearly understand that the method according to the above embodiments can be implemented by means of software in combination with a necessary general hardware platform, and of course, can also be implemented through hardware, but the former is a preferable implementation in many cases. Based on such understanding, the technical solution of the present disclosure may essentially be, or the part that contributes to the prior art may be embodied in the form of a software product stored in a storage medium (such as an ROM, an RAM, a magnetic disk, or an optical disk) and including a number of instructions for causing a terminal device (which may be a cell phone, a computer, a server, or a network device, etc.) to perform the methods of various embodiments of the present disclosure.

Embodiment 2

In this embodiment, a mobile terminal for implementing the above embodiments and preferred implementations is further provided, and those that have been illustrated as above will be omitted herein. As used below, the term "unit" may implement a combination of software and/or hardware of predetermined functions. Although the devices described in the following embodiments are preferably implemented through software, hardware or a combination of software and hardware are also possible and contemplated.

Figure 9:
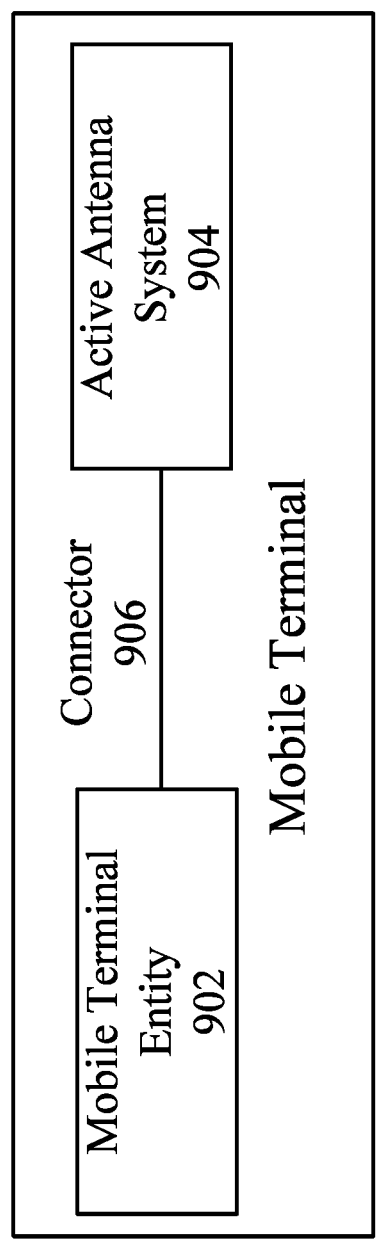
FIG. 9 is a block diagram showing a structure of a mobile terminal according to an embodiment of the present disclosure.

FIG. 9 is a block diagram showing a structure of a mobile terminal according to an embodiment of the present disclosure. As shown in FIG. 9, the mobile terminal device comprises a mobile terminal entity 902 and an active antenna system 904, wherein the active antenna system is detachably coupled to the mobile terminal entity via a connector 906.

It should be noted that, in this embodiment, the active antenna system is detachably coupled to the mobile terminal entity as an expandable independent module. In this way, while improving the transmit power and the receiving sensitivity of the terminal, it is also possible to make a power amplifier of the mobile terminal entity have no need to work when the signal radiation range is enlarged. Thus, the power consumption of the terminal itself is greatly reduced, and the battery life is further endurable. In addition, when used for a long time or in high intensity, the processor is also less likely to be down-converted due to overheating, which avoids terminal disconnection due to terminal overheating having an impact on the terminal performance, thereby ensuring normal operation of the terminal.

Alternatively, in this embodiment, the mobile terminal entity comprises a baseband unit, a radio frequency circuit, an antenna detecting unit, an antenna tuning unit, an internal antenna, wherein:

1) the baseband unit is configured to synthesize a baseband signal to be transmitted, or decode a baseband signal received from the radio frequency circuit;

2) the radio frequency circuit is configured to modulate a baseband signal for transmission, and demodulate and transmit a received wireless signal to the baseband unit;

3) the antenna detecting unit is configured to detect a state of a detection point, and return corresponding state information to the baseband unit so that the baseband unit determines whether an antenna coupled thereto is an internal passive antenna, an external passive antenna, or an external active antenna;

4) the antenna tuning unit is configured to perform antenna tuning based on a type of the antenna in use to achieve impedance matching between a transmitter and the antenna; and 5) the internal passive antenna is coupled to the antenna tuning unit.

Alternatively, in this embodiment, 1) the number of the antenna detecting unit is two, i.e., a first antenna detecting unit and a second antenna detecting unit; 2) the number of the antenna detecting unit is two, i.e., a first antenna tuning unit and a second antenna tuning unit; and 3) the number of the internal passive antenna is two, i.e., a first internal antenna and a second internal antenna, wherein the first internal antenna is configured to receive and transmit a wireless signal, the second internal antenna is configured to receive a wireless signal, and the first internal antenna and the second internal antenna are coupled to the first antenna tuning unit and the second antenna tuning unit, respectively.

Alternatively, in this embodiment, the mobile terminal entity further includes a third bias tee and a fourth bias tee, wherein a first end and a second end of the third bias tee are coupled to the first antenna detecting unit and the first antenna tuning unit, respectively, and a third end of the third bias tee is coupled to a first bias tee of the active antenna system via a connector; and a first end and a second end of the fourth bias tee are coupled to the second antenna detecting unit and the second antenna tuning unit, respectively, and a third end of the fourth bias tee is coupled to a second bias tee of the active antenna system via a connector.

It should be noted that, in this embodiment, the role of said bias tees may be, but not limited to, enabling a radio frequency signal to be transmitted by the terminal and a DC signal (including a control signal and a detecting voltage) in the terminal to be outputted from one shared connector port, or dividing a signal inputted via a transmission path into a radio frequency signal and a DC signal. The above is only for an example, and not limited as such in this embodiment.

In addition, in this embodiment, said terminal can be used either in a time division duplex working mode or in a frequency division duplex working mode, which is not limited in this embodiment.

According to the embodiments provided by the present disclosure, said active antenna system is detachably coupled to the mobile terminal entity as an expandable independent unit. In this way, while improving the transmit power and the receiving sensitivity of the terminal, it is also possible to make a power amplifier of the mobile terminal entity have no need to work when the signal radiation range is enlarged. Thus, the power consumption of the terminal itself is greatly reduced, and the battery life is further endurable. In addition, when used for a long time or in high intensity, the processor is also less likely to be down-converted due to overheating, which avoids terminal disconnection due to terminal overheating having an impact on the terminal performance, thereby ensuring normal operation of the terminal.

As an alternative solution, the mobile terminal entity comprises a baseband unit, a radio frequency circuit, an antenna detecting unit, an antenna tuning unit, and an internal antenna; wherein:

1) the baseband unit is configured to synthesize a baseband signal to be transmitted, or decode a baseband signal received from the radio frequency circuit;

2) the radio frequency circuit is configured to modulate a baseband signal for transmission, and demodulate and transmit a received wireless signal to the baseband unit;

3) the antenna detecting unit is configured to detect a state of a detection point, and return corresponding state information to the baseband unit so that the baseband unit determines whether an antenna coupled thereto is an internal passive antenna, an external passive antenna, or an external active antenna;

4) the antenna tuning unit is configured to perform antenna tuning based on a type of the antenna in use to achieve impedance matching between a transmitter and the antenna; and 5) the internal passive antenna is coupled to the antenna tuning unit.

As an alternative solution, wherein:

1) the number of the antenna detecting unit is two, i.e., a first antenna detecting unit and a second antenna detecting unit;

2) the number of the antenna detecting unit is two, i.e., a first antenna tuning unit and a second antenna tuning unit; and 3) the number of the internal passive antenna is two, i.e., a first internal antenna and a second internal antenna, wherein the first internal antenna is configured to receive and transmit a wireless signal, the second internal antenna is configured to receive a wireless signal, and the first internal antenna and the second internal antenna are coupled to the first antenna tuning unit and the second antenna tuning unit, respectively.

For example, as shown in FIG. 4, in an active antenna system as shown in FIG. 4, an active power amplifier 102 may be detachably electrically coupled to a mobile terminal 204 via a first connector 202-1 (i.e., connectors 1a and 1b) and a first connector 202-2 (i.e., connectors 2a and 2b), wherein the active power amplifier 102 includes an active antenna circuit 206 for amplifying and filtering a signal. A passive antenna 104 is detachably electrically coupled to the active power amplifier 102 via a second connector 208-1 (i.e., connectors 1c and 1d) and a second connector 208-2 (i.e., connectors 2c and 2d). It is assumed that the active power amplifier also includes two bias tees, which are a first bias tee 302-1 and a second bias tee 302-2, respectively, wherein the first bias tee 302-1 is coupled to a signal transceiving path, and the second bias tee 302-2 is coupled to a signal receiving path. Correspondingly, in this embodiment, as shown in FIG. 4, said mobile terminal entity 204 includes a third bias tee 302-3 and a fourth bias tee 302-4, and further comprises a baseband unit 402, a radio frequency circuit 404, antenna detecting units (an antenna detecting unit 406-1 and an antenna detecting unit 406-2), antenna tuning units (an antenna tuning unit 408-1 and an antenna tuning unit 408-2), and internal antennas (an internal antenna 410-1 and an internal antenna 410-2).

As an alternative solution, the radio frequency circuit is in the time division duplex mode, and comprises a radio frequency transceiver chip, a first signal transmitting circuit, a first signal receiving circuit, a second signal receiving circuit, and a closed-loop power control circuit; wherein:

1) the first signal transmitting circuit comprises a fourth switch, a third power amplifier, a fourth filter, a fifth switch, and a second coupler, wherein an input end of the fourth switch is coupled to an output end of the radio frequency transceiver chip; the fourth switch, the third power amplifier, the fourth filter, the fifth switch, and the second coupler are coupled one by one in series; an output end of the fourth switch is coupled to the fifth switch; and the second coupler is coupled to the first antenna tuning unit;

2) the first signal receiving circuit comprises a fifth filter and a third low noise amplifier, wherein an input end of the fifth filter is coupled to the fifth switch, an output end of the fifth filter is coupled to an input end of the third low noise amplifier, and an output end of the third low noise amplifier is coupled to the radio frequency transceiver chip;

3) the second signal receiving circuit comprises a sixth switch, a sixth filter, and a fourth low noise amplifier which are coupled one by one in series, wherein an input end of the sixth switch is coupled to the second antenna tuning unit, and an output end of the fourth low noise amplifier is coupled to the radio frequency transceiver chip; and 4) the closed-loop power control circuit comprises a seventh switch, wherein an output end of the seventh switch is coupled to output ends of the second coupler and the sixth switch, respectively, and an output end of the seventh switch is coupled to the radio frequency transceiver chip.

Specific circuit connection is as shown in FIGS. 5 and 6. Reference can be made to the description in Embodiment 1 for the working steps of the mobile terminal in the time division duplex working mode, details of which are omitted herein in this embodiment.

As an alternative solution, the radio frequency circuit is in the frequency division duplex mode, and the radio frequency circuit comprises a radio frequency transceiver chip, a second transmitting circuit, a third receiving circuit, a fourth receiving circuit, and a second closed-loop power control circuit; wherein:

1) the second transmitting circuit comprises a fourth switch, a third power amplifier, a fourth duplexer, and a second coupler, wherein an input end of the fourth switch is coupled to an output end of the radio frequency transceiver chip; the fourth switch, the third power amplifier, the fourth duplexer, and the second coupler are coupled one by one in series; and the second coupler is coupled to the first antenna tuning unit;

2) the third receiving circuit comprises a third low noise amplifier, wherein an input end of the third low noise amplifier is coupled to the fourth duplexer, and an output end of the low noise amplifier is coupled to the radio frequency transceiver chip;

3) the second closed-loop power control circuit comprises a fifth duplexer and a fourth low noise amplifier, wherein an input end of the fifth duplexer is coupled to the second antenna tuning unit, an output end of the fifth duplexer is coupled to an input end of the fourth low noise amplifier, and an output end of the fourth low noise amplifier is coupled to the radio frequency transceiver chip; and 4) the radio frequency circuit further includes a seventh switch, which is coupled to the second coupler, the fifth duplexer, and the radio frequency transceiver chip, respectively.

Specific circuit connection is as shown in FIGS. 7 and 8. Reference can be made to the description in Embodiment 1 for the working steps of the mobile terminal in the frequency division duplex working mode, details of which are omitted herein again in this embodiment.

It should be noted that these above units can be implemented by software or hardware. For the hardware, the above units may be implemented in, but not limited to, following manners, such as. the above units all being located in a same processor, or the above units respectively being located in different processors and functioning in any combination form.

Embodiment 3

Figure 10:
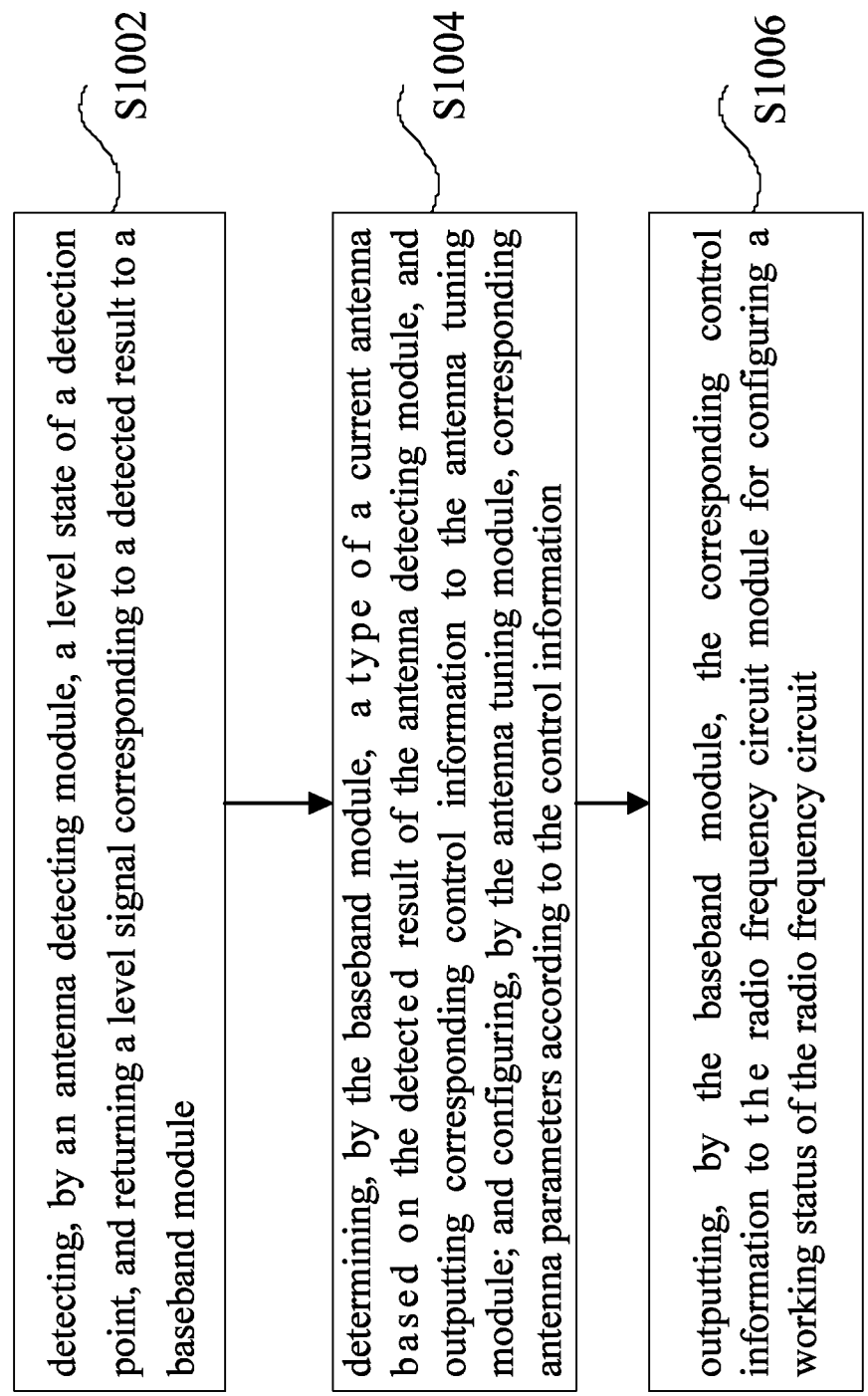
FIG. 10 is a flowchart of a configuration method of an antenna system according to an embodiment of the present invention.

In this embodiment, a configuration method of an antenna system for applying to a mobile terminal is further provided. As shown in FIG. 10, the method comprises steps of:

in step S1002, the antenna detecting unit detects a voltage level state of a detection point, and returns a level signal corresponding to a detected result to a baseband unit;

in step S1004, the baseband unit determines whether a current antenna is an internal passive antenna, an external passive antenna, or an external active antenna based on the detected result of the antenna detecting unit, and outputs corresponding control information to the antenna tuning unit; and the antenna tuning unit configures corresponding antenna parameters according to the control information;

in step S1006, the baseband unit outputs the corresponding control signal to a unit of the radio frequency circuit for configuring a working status of the radio frequency circuit.

Alternatively, in this embodiment, said configuration method of the antenna system may be applied in, but not limited to, an active antenna system. That is, before use, coupling between the active power amplifier and the passive antenna can be first performed, and then coupled to the mobile terminal. After the active antenna is assembled in position, the mobile terminal then starts up, and the working steps thereof are as follows.

In step 1, under control of the baseband processing chip, the antenna detecting circuit first detects a voltage level state of a detection point, and returns a level signal corresponding to a detected result to the baseband processing chip.

In step 2, the baseband chip determines, according to the detected result of the antenna detecting circuit, whether the antenna is an internal passive antenna, an external passive antenna, or an external active antenna, and outputs corresponding control information to the antenna tuning unit; and the antenna tuning unit accordingly configures corresponding antenna parameters to achieve a good match between the terminal and the corresponding antenna.

In step 3, the baseband processing chip outputs corresponding control information to the radio frequency circuit for configuring a working status of the radio frequency circuit.

In step 4, when an internal antenna or an external passive antenna is in use, the mobile terminal will enter a normal working status after the first three steps; when the external active antenna is in use, the mobile terminal could work normally only after the baseband processing chip outputs corresponding control information to the active power amplifier and configures it into a corresponding working status.

Alternatively, in this embodiment, the detection point is a connector between the mobile terminal entity and the active antenna system, wherein when the detection point is at a high level, it is determined that an external active antenna is coupled to the connector; when the detection point is at a low level, it is determined that an passive antenna is coupled to the connector; and when the detection point is in a high impedance state, it is determined that an internal passive antenna is coupled to the connector.

Alternatively, in this embodiment, when the current antenna is an external active antenna, the baseband unit outputs corresponding control signal to the active power amplifier, and configures the active power amplifier into a corresponding working status.

According to the embodiments provided by the present disclosure, when communication is performed by using the above active antenna system, not only the transmitting power and the receiving sensitivity of the terminal can be improved, but also the power amplification can be realized in the active power amplifier, thereby avoiding impact on performance of the terminal itself due to overheating of the terminal entity when the power consumption increase is caused by the transmitting power promotion. In addition, in this embodiment, closed loop power control is provided to ensure more precise control of the transmitting power of the terminal, thereby reducing system interference and thus increasing system capacity.

As an alternative solution, configuring the active power amplifier into a corresponding working status comprises:

1) disabling a transmitting power amplification circuit in the radio frequency circuit, and enabling a transmit power amplification circuit in the active power amplifier.

According to the embodiments of the present application, through disabling of the transmitting power amplification circuit in the radio frequency circuit and enabling of the transmit power amplification circuit in the active power amplifier, detachable coupling of the active antenna system is achieved, and the active antenna system can be coupled to the mobile terminal as an expandable independent device. In this way, while improving the transmit power and the receiving sensitivity of the terminal, it is also possible to make the power amplifier of the mobile terminal entity have no need to work when the active power amplifier is in use. Thus, the power consumption of the terminal itself is greatly reduced, and the battery life is further endurable. In addition, when used for a long time or in high intensity, the processor is also less likely to be down-converted due to overheating, which avoids terminal disconnection due to terminal overheating having an impact on the terminal performance, thereby ensuring normal operation of the terminal.

Embodiment 4

According to another embodiment of the present disclosure, a mobile terminal is further provided, which comprises a baseband processing chip and a radio frequency circuit. The radio frequency circuit comprises a radio frequency transceiver chip and a closed-loop power control circuit. The closed-loop power control circuit is configured to derive a power detection signal from a signal to be transmitted, and send the power detection signal to the radio frequency transceiver chip. The radio frequency transceiver chip is configured to process and then input the power detection signal to the baseband processing chip. The baseband processing chip is configured to calculate an actual transmitting power of the terminal based on to the power detection signal, and then adjust its own output power as required.

Alternatively, the radio frequency circuit further includes a radio frequency front-end circuit, which includes a power amplifier and a filter, wherein an input end of the power amplifier is coupled to an output end of the radio frequency transceiver chip, and an output end of the power amplifier is coupled to an input end of the filter; and the closed-loop power control circuit includes a first coupler and a first switch, wherein an input end of the first coupler is coupled to an output end of the filter, a first output end of the first coupler is coupled to a first antenna coupled internally or externally, a second output end of the first coupler is coupled to the first switch, and the other end of the first switch is coupled to the radio frequency transceiver chip, and wherein the first antenna is a signal receiving and transmitting antenna.

Alternatively, the closed-loop power control circuit further includes a second coupler and a second switch, wherein an input end of the second coupler is coupled to a second antenna coupled externally, and an output end of the second coupler is coupled to the second switch, and the second switch is coupled to the first switch, and wherein the second antenna is a signal receiving antenna.

For specific examples in this embodiment, reference can be made to the examples described in the above embodiments and the alternative implementations, details of which are omitted herein in this embodiment.

Embodiment 5

In the embodiments of the present disclosure, a storage medium is further provided. Alternatively, in this embodiment, the storage medium may be configured to store program code for performing the steps of:

in step S1, the antenna detecting unit detects a voltage level state of a detection point, and returns a level signal corresponding to a detected result to a baseband unit;

in step S2, the baseband unit determines, based on the detected result of the antenna detecting unit, whether a current antenna is an internal passive antenna, an external passive antenna, or an external active antenna, and outputs corresponding control information to the antenna tuning unit; and the antenna tuning unit configures corresponding antenna parameters according to the control information;

in step 3, the baseband unit outputs the corresponding control signal to a unit of the radio frequency circuit for configuring a working status of the radio frequency circuit.

Alternatively, in this embodiment, said storage medium may include, but is not limited to, a USB flash disk, a Read-Only Memory (ROM), a Random Access Memory (RAM), a mobile hard disk, a magnetic memory, a disk, and various other media that can store the program code.

Alternatively, for the specific examples in this embodiment, reference may be made to the examples described in the above embodiments and the alternative implementations, details of which are omitted herein in this embodiment.

It will be apparent to those skilled in the art that the various units or steps of the present disclosure described above can be implemented by a universal computing device, and they can be integrated on a single computing device or distributed across a network of multiple computing devices. Alternatively, these units or steps may be implemented by program code executable by a computing device so as to be stored in a storage device for execution by the computing device. In some cases, the steps shown or described may be performed in an order different from the order listed herein, or they may be separately fabricated into individual integrated circuit modules. Alternatively, a plurality of units or steps thereof may be fabricated into a single integrated circuit for implementation. Thus, the present disclosure is not limited to any specific combination of hardware and software.

These above are only preferred embodiments of the present disclosure, and are not intended to limit the present disclosure. For those skilled in the art, various modifications and changes can be made in the present disclosure. Any modifications, equivalent substitutions, improvements, etc. made within the spirit and principles of the present disclosure are intended to be included within the scope of the present disclosure.

What is claimed is:

1. An active antenna system, characterized in that, comprising an active power amplifier and an external antenna, wherein:
    the active power amplifier is detachably electrically coupled to an electronic device via a connector between the electronic device and the active antenna system, wherein the active power amplifier includes an active antenna circuit for amplifying and filtering a signal transmitted and received by the external antenna; and
    the external antenna is detachably electrically coupled to the active power amplifier,
    wherein the electronic device detects a detection point disposed at the connector, and determines a currently used antenna is an internal passive antenna, an external passive antenna, or an external active antenna, wherein when the detection point is at a high level, it is determined that an external active antenna is coupled to the connector; when the detection point is at a low level, it is determined that an external passive antenna is coupled to the connector; and when the detection point is in a high impedance state, it is determined that an internal passive antenna of the electronic device is coupled to the connector.

2. The system according to claim 1, characterized in that, the active power amplifier further comprises:
    bias tees, coupled between connectors and the active antenna circuit.

3. The system according to claim 1, characterized in that, the active power amplifier further comprises:
    a power management chip, configured to manage an external power supply.

4. The system according to claim 2, characterized in that, the external antenna comprises a first external antenna and a second external antenna, wherein the first external antenna is configured to receive and transmit a wireless signal, and the second external antenna is configured to receive a wireless signal.

5. The system according to claim 4, characterized in that, the active antenna circuit comprises a signal transceiving path corresponding to the first external antenna and a signal receiving path corresponding to the second external antenna, and the bias tees comprises a first bias tee and a second bias tee, wherein the first bias tee is coupled to the signal transceiving path, and the second bias tee is coupled to the signal receiving path.

6. The system according to claim 5, characterized in that, the active antenna circuit is in a time division duplex mode, wherein:

the signal transceiving path comprises: a first switch, a first directional coupler, a first power amplifier, a second power amplifier, a second directional coupler, a first filter, a second switch, a first coupler, and a second filter, and a first low noise amplifier, wherein a first end of the first switch is coupled to the first bias tee, and a second end of the first switch is coupled to the first directional coupler; the first power amplifier and the second power amplifier are coupled in parallel and then coupled in series between the first directional coupler and the second directional coupler; the first filter is coupled in series between the second directional coupler and the second switch, the second switch is further coupled to the first coupler and the second filter, respectively, and the first low noise amplifier is coupled between the second filter and the first switch; and the signal receiving path comprises: a third switch, a second low noise amplifier, a third filter, and an inverter, wherein a first end of the third switch is coupled to the second bias tee, a second end of the third switch is coupled to the second low noise amplifier, the second low noise amplifier is further coupled to the third filter and the inverter, respectively, and the inverter is further coupled to the second bias tee; a third end of the third switch is coupled to the first coupler in the signal transceiving path, a fourth end of the third switch is coupled to the first bias tee, the second low noise amplifier is further coupled to the first low noise amplifier in the signal transceiving path, and the inverter is further coupled to the first power amplifier and the second power amplifier in the signal transceiving path, respectively.

7. The system according to claim 5, characterized in that, the active antenna circuit is in a frequency division duplex mode, wherein:

the signal transceiving path comprises: a first duplexer, a first directional coupler, a first power amplifier, a second power amplifier, a second directional coupler, a second duplexer, a first coupler, and a first low noise amplifier, wherein a first end of the first duplexer is coupled to the first bias tee, and a second end of the first duplexer is coupled to the first directional coupler, the first power amplifier and the second power amplifier are coupled in parallel and then coupled in series between the first directional coupler and the second directional coupler, the second duplexer is coupled in series between the second directional coupler and the first coupler, the first low noise amplifier is coupled between the first duplexer and the second duplexer, and the first power amplifier and the second power amplifier each are coupled to the first bias tee; and the signal receiving path comprises: a third duplexer, a second low noise amplifier, and a third filter, wherein a first end of the third duplexer is coupled to the second bias tee, a second end of the third duplexer is coupled to the second low noise amplifier, the second low noise amplifier is further coupled to the third filter and the second bias tee, respectively, a third end of the third duplexer is coupled to the first coupler in the signal transceiving path, and the second low noise amplifier is further coupled to the first low noise amplifier in the signal transceiving path.

8. A mobile terminal, characterized in that, comprising a mobile terminal entity and the active antenna system according to claim 1, wherein the active antenna system is detachably coupled to the mobile terminal entity.

9. The mobile terminal according to claim 8, characterized in that, the mobile terminal entity comprises: a baseband circuit, a radio frequency circuit, an antenna detecting circuit, an antenna tuning circuit, and an internal antenna, wherein:

the baseband circuit is configured to synthesize a baseband signal to be transmitted, or decode a baseband signal received from the radio frequency circuit;

the radio frequency circuit is configured to modulate a baseband signal for transmission, and demodulate and transmit a received wireless signal to the baseband circuit;

the antenna detecting circuit is configured to detect a state of a detection point, and return corresponding state information to the baseband circuit so that the baseband circuit determines an type of an antenna coupled thereto;

the antenna tuning circuit is configured to perform antenna tuning based on a type of the antenna in use to achieve impedance matching between a transmitter and the antenna; and the internal passive antenna is coupled to the antenna tuning circuit.

10. The mobile terminal according to claim 9, characterized in that:

the antenna detecting circuit includes a first antenna detecting circuit and a second antenna detecting circuit;

the antenna tuning circuit includes a first antenna tuning circuit and a second antenna tuning circuit; and the internal passive antenna includes a first internal antenna and a second internal antenna, wherein the first internal antenna is configured to receive and transmit a wireless signal, the second internal antenna is configured to receive a wireless signal, and the first internal antenna and the second internal antenna are coupled to the first antenna tuning circuit and the second antenna tuning circuit, respectively.

11. The mobile terminal according to claim 10, characterized in that, the mobile terminal entity further includes a third bias tee and a fourth bias tee, wherein a first end and a second end of the third bias tee are coupled to the first antenna detecting circuit and the first antenna tuning circuit, respectively, and a third end of the third bias tee is coupled to the first bias tee of the active antenna system via a connector; and a first end and a second end of the fourth bias tee are coupled to the second antenna detecting circuit and the second antenna tuning circuit, respectively, and a third end of the fourth bias tee is coupled to the second bias tee of the active antenna system via a connector.

12. The mobile terminal according to claim 11, characterized in that, the radio frequency circuit is in a time division duplex mode, and the radio frequency circuit comprises: a radio frequency transceiver chip, a first signal transmitting circuit, a first signal receiving circuit, a second signal receiving circuit, and a closed-loop power control circuit, wherein:

the first signal transmitting circuit comprises a fourth switch, a third power amplifier, a fourth filter, a fifth switch, and a second coupler, wherein an input end of the fourth switch is coupled to an output end of the radio frequency transceiver chip, the fourth switch, the third power amplifier, the fourth filter, the fifth switch, and the second coupler are coupled one by one in series, an output end of the fourth switch is coupled to the fifth switch, and the second coupler is coupled to the first antenna tuning circuit;

the first signal receiving circuit comprises: a fifth filter and a third low noise amplifier, wherein an input end of the fifth filter is coupled to the fifth switch, an output end of the fifth filter is coupled to an input end of the third low noise amplifier, and an output end of the third low noise amplifier is coupled to the radio frequency transceiver chip;

the second signal receiving circuit comprises: a sixth switch, a sixth filter, and a fourth low noise amplifier which are coupled one by one in series, wherein an input end of the sixth switch is coupled to the second antenna tuning circuit, and an output end of the fourth low noise amplifier is coupled to the radio frequency transceiver chip; and the closed-loop power control circuit comprises: a seventh switch, wherein an input end of the seventh switch is coupled to output ends of the second coupler and the sixth switch, respectively, and an output end of the seventh switch is coupled to the radio frequency transceiver chip.

13. The mobile terminal according to claim 11, characterized in that, the radio frequency circuit is in a frequency division duplex mode, and the radio frequency circuit comprises: a radio frequency transceiver chip, a second transmitting circuit, a third receiving circuit, a fourth receiving circuit, and a second closed-loop power control circuit, wherein:

the second transmitting circuit comprises: a fourth switch, a third power amplifier, a fourth duplexer, and a second coupler, wherein an input end of the fourth switch is coupled to an output end of the radio frequency transceiver chip, the fourth switch, the third power amplifier, the fourth duplexer, and the second coupler are coupled one by one in series, and the second coupler is coupled to the first antenna tuning circuit;

the third receiving circuit comprises: a third low noise amplifier, wherein an input end of the third low noise amplifier is coupled to the fourth duplexer, and an output end of the third low noise amplifier is coupled to the radio frequency transceiver chip;

the second closed-loop power control circuit comprises: a fifth duplexer and a fourth low noise amplifier, wherein an input end of the fifth duplexer is coupled to the second antenna tuning circuit, an output end of the fifth duplexer is coupled to an input end of the fourth low noise amplifier, and an output end of the fourth low noise amplifier is coupled to the radio frequency transceiver chip; and the radio frequency transceiver chip further comprises: a seventh switch, which is coupled to the second coupler, the fifth duplexer, and the radio frequency transceiver chip, respectively.

14. A configuration method of an antenna system for applying to the mobile terminal according to claim 12, characterized in that, comprising steps of:

detecting, by the antenna detecting circuit, a level state of a detection point, and returning a level signal corresponding to a detected result to the baseband circuit;

determining, by the baseband circuit, whether a current antenna is an internal passive antenna, an external passive antenna, or an external active antenna based on the detected result of the antenna detecting circuit, and outputting corresponding control information to the antenna tuning circuit; and configuring, by the antenna tuning circuit, corresponding antenna parameters according to the control information; and outputting, by the baseband circuit, the corresponding control information to a circuit of the radio frequency circuit for configuring a working status of the radio frequency circuit.

15. The configuration method according to claim 14, characterized in that, the detection point is disposed at a connector between the mobile terminal entity and the active antenna system, wherein when the detection point is at a high level, it is determined that an external active antenna is coupled to the connector; when the detection point is at a low level, it is determined that an external passive antenna is coupled to the connector; and when the detection point is in a high impedance state, it is determined that an internal passive antenna is coupled to the connector.

16. The configuration method according to claim 15, characterized in that:

when the current antenna is an external active antenna, the baseband circuit outputs corresponding control information to the active power amplifier and configures the active power amplifier into a corresponding working status.

17. The configuration method according to claim 16, characterized in that, configuring the active power amplifier into a corresponding working state comprises:

disabling a transmitting power amplification circuit in the radio frequency circuit, and enabling a transmitting power amplification circuit in the active power amplifier.

* * * * *